United States Patent [19]

McCorsley, III et al.

[11] 4,142,913

[45] Mar. 6, 1979

[54] PROCESS FOR MAKING A PRECURSOR OF A SOLUTION OF CELLULOSE

[75] Inventors: Clarence C. McCorsley, III; Julianna K. Varga, both of Asheville, N.C.

[73] Assignee: Akzona Incorporated, Asheville, N.C.

[21] Appl. No.: 819,081

[22] Filed: Jul. 26, 1977

[51] Int. Cl.$^2$ .............................................. C08L 1/02
[52] U.S. Cl. ..................................... 106/186; 8/130.1
[58] Field of Search ...................... 106/186, 203, 163; 536/37, 41; 8/130.1

[56] References Cited

U.S. PATENT DOCUMENTS

| | | | |
|---|---|---|---|
| 3,447,956 | 6/1969 | Johnson | 8/130.1 |
| 3,508,941 | 4/1970 | Johnson | 106/126 |

*Primary Examiner*—Theodore Morris

*Attorney, Agent, or Firm*—Francis W. Young; Jack H. Hall; Clelle W. Upchurch

[57] ABSTRACT

A process is provided for making a solid precursor of a solution of cellulose in a tertiary amine oxide by suspending cellulose in a mixture containing a tertiary amine oxide and water under conditions where the amine oxide will dissolve the cellulose and cooling the resulting product to ambient temperature to provide a solid solution of cellulose in amine oxide. The product may be comminuted to form chips which are adapted to be fed to an extruder or other apparatus for shaping it into a cellulosic article. An organic liquid which is miscible with the tertiary amine oxide and is a non-solvent for the cellulose may be included with the amine oxide-water mixture to improve the up-take of the tertiary amine oxide by the cellulose.

14 Claims, No Drawings

PROCESS FOR MAKING A PRECURSOR OF A SOLUTION OF CELLULOSE

This invention relates generally to regenerated cellulose and more particularly to a process for preparing a solid cellulosic-amine oxide material which can be used for making shaped cellulosic articles such as fibers and filaments.

A process for dissolving cellulose in a tertiary amine oxide is disclosed by Graenacher et al. in U.S. Pat. No. 2,179,181. In accordance with the disclosed process from 7 to 10% by weight of cellulose is dissolved in 93 to 90% by weight of a tertiary amine oxide to form a viscous solution which is poured or spun into an aqueous precipitating bath to precipitate the cellulose. The tertiary amine oxides suitable for practicing the disclosed process contain fourteen or less carbon atoms and may be an oxide of a trialkyl amine or of an alkylcycloaliphatic tertiary amine. As is apparent from the working examples of the patent, the resulting solution has the disadvantage of having a low solids content and a high viscosity.

Another process for dissolving cellulose or other compounds having strong intermolecular hydrogen bonding in a tertiary amine oxide is disclosed by Johnson in U.S. Pat. No. 3,447,939. A cyclic mono (N-methylamine-N-oxide) compound such as N-methylmorpholine-N-oxide is used as the solvent. The solution can be used in chemical reactions involving the dissolved compound or to precipitate the cellulose to form a film or filament. In accordance with the process the solution is maintained as a liquid until it is used. The resulting solutions have much the same disadvantages of those prepared by the process disclosed in U.S. Pat. No. 2,179,181 because they are also of low solids content and have a high viscosity.

In accordance with the process disclosed in U.S. Pat. No. 3,508,941, two or more different polymers are dissolved in a cyclic mono (N-methylamine-N-oxide) compound and are precipitate together to produce a bi-component polymer mixture. A diluent such as dimethyl sulfoxide, N-methyl-pyrrolidone or sulfolane may be added to the solution to reduce its viscosity. As indicated by the examples set forth in the patent, only solid solutions having low percentages of cellulose can be prepared when cellulose is one of the compounds used in the preparation of the solution.

It is an object of this invention to provide a process for making a solid cellulosic product which is adapted to be heated to prepare a solution of cellulose in a tertiary amine oxide. Another object of the invention is to provide a chip or similar granular cellulosic product which can be heated alone to form a solution of cellulose in an amine oxide which is suitable for shaping and coagulating the cellulose. Another object of the invention is to provide a process for making a cellulosic product which can be comminuted, stored and otherwise treated as a solid material and can be heated later to convert the product into a solution of cellulose which is adapted for shaping into a cellulosic article such as by extrusion or spinning. A more specific object of the invention is to provide a cellulosic product which can be converted into a solution of cellulose in a tertiary amine oxide which has a higher solids content than the amine oxide solutions of the above-discussed prior art. A still more specific object of the invention is to provide a precursor of a solution of cellulose in a tertiary amine oxide which is a solid at ambient temperatures but becomes a solution adapted to be extruded or spun when heated to a temperature above ambient.

The foregoing objects and others are accomplished in accordance with this invention, generally speaking, by providing a process wherein cellulose is mixed with a liquid containing a tertiary amine oxide and a liquid non-solvent containing water which assists in intimately associating the tertiary amine oxide with the fibers of the cellulose to facilitate absorption of the tertiary amine oxide, the resulting mixture is maintained at a temperature where the cellulose dissolves in the tertiary amine oxide until a solution is obtained and is cooled to form a solid solution suitable for shaping into a cellulosic article such as by spinning or extrusion. The non-solvent may be water alone or a mixture of water and an organic non-solvent which is compatible with the tertiary amine oxide, water and cellulose. It is preferred to use only the calculated amount of tertiary amine oxide necessary to complete dissolution of the cellulose under extrusion conditions of heat and pressure. However, an excess of water, say 18-30% by weight of the amine oxide solvent-non-solvent system is desirable in forming a solid solution because the excess enhances the uniformity of distribution of the solvent throughout the cellulose and reduces the time necessary to complete the dissolution. If an organic non-solvent is used, dissolution is brought about in an evacuated vessel with removal of the organic non-solvent and any excess water that may be present. The solid solution may be comminuted to form chips or other particles suitable for feeding to an extruder or other device for redissolving the chip by the application of heat and/or pressure and shaping the melt into a cellulosic article.

In one embodiment of the invention, cellulose is mixed with a liquid solution of a tertiary amine oxide and liquid non-solvent for cellulose in such proportions and at a temperature where the cellulose absorbs tertiary amine oxide and non-solvent and substantially completely swells in the tertiary amine oxide. It is believed that the water and non-solvent cause the fibers of the cellulose to swell and thereby facilitate uniform and rapid wetting of the cellulose throughout its mass by the liquid containing the tertiary amine oxide prior to dissolution of the cellulose which takes place on removal of the non-solvent. The non-solvent may be water or it may be a mixture of water and organic non-solvent. A slurry of the cellulose, amine oxide solvent and non-solvent is made and a portion of the non-solvent is removed therefrom by mixing under vacuum at an elevated temperature until solution occurs. Preferably, the cellulose-amine oxide-non-solvent mixture is heated to a temperature of about 70° C. or higher during mixing to accelerate swelling and dissolution of the cellulose. At low concentrations of cellulose, e.g. 10%, solution will occur when the water content (based on total cellulose, solvent and water) reaches the range of about 10–15% (depending upon the amine oxide employed) (all of an organic non-solvent will have been first removed). At higher concentrations of cellulose, e.g. 20–30%, solution will occur when the water content, after removal of any organic amine non-solvent, reaches about 2–9%.

The resulting solution is cooled until solid and may then be comminuted such as by grinding or chopping to form fragments or chips which are suitable for extrusion, spinning, molding or the like. They may be stored for later conversion into a solution or they may be heated immediately to form a solution of cellulose in a tertiary amine oxide and water and shaped.

The chip product of the invention may be used for making a shaped cellulose product by heating the solid cellulose containing absorbed tertiary amine oxide and water to a temperature where the cellulose dissolves in the tertiary amine oxide and removing the tertiary amine oxide while shaping the solution.

The solid solution produced by the process of the invention is a solid cellulosic product containing amine oxide and some water which, when heated, will produce a melt adapted for shaping. One of the advantages of the process of this invention is that the water or water-organic non-solvent mixture mixed with the tertiary amine oxide assists in transporting the tertiary amine oxide to the fibers and assists in uniformly dispersing the amine oxide in the cellulose. The use of the non-solvent reduces the time necessary to transport and uniformly disperse the amine oxide throughout the cellulose. The chip product can be shaped by merely heating it sufficiently to provide an extrudable solid raw material. The invention thus provides a method for making a solid raw material which is complete in itself for the extrusion of cellulose film or for spinning cellulose fibers and yarns. The use of a non-solvent, whether water alone or a water-organic non-solvent system, assists in achieving a homogeneous solution by slowing down the dissolution so that amine oxide is absorbed uniformly.

It has been found that cellulose sheet or shreds suspended in a tertiary amine oxide and water or tertiary amine oxide, water and organic non-solvent will dissolve when the suspension is heated with simultaneous removal of any organic non-solvent and any excess water present in the suspension to form a high solids solution which can be cooled to form a solid solution adapted to be comminuted to form chips or the like.

The organic non-solvent is removed during mixing or dissolution at any temperature which permits efficient and rapid removal of the solvent under vacuum. With most non-solvents the temperature may be from about 70° C. to about 95° C. during non-solvent removal. The non-solvent may be removed under vacuum at a pressure of as low as 0.01 mm of mercury.

The solid product obtained by cooling down the solution can be transferred immediately to suitable equipment for shaping it into a regenerated cellulose product or it can be stored until some later date. The solid solution is substantially free from unabsorbed liquid when it is comminuted to form chips or the like.

The relative proportions of cellulose, water, amine oxide and liquid organic non-solvent for cellulose which are mixed together may be varied broadly depending upon the composition desired for the product as long as sufficient amine oxide-water mixture will remain in the solid solution to dissolve the cellulose after the non-solvent has been removed. Preferably, the ratio of liquid phase to cellulose in the slurry should be such that the cellulose completely dissolves but the excess of liquid phase is not so great that unnecessary separation of large volumes of liquid is required.

The water content of the liquid mixture of amine oxide-water or amine oxide-water-organic non-solvent mixed with the cellulose should be as low as possible to avoid removing large volumes of water during the dissolving step. However, in the embodiment using an organic non-solvent, the ratio of organic non-solvent and water to cellulose must be such that sufficient water remains after the organic non-solvent is removed that the melting point of the cellulose will be below the decomposition point of the tertiary amine oxide. When the percentage by weight cellulose in the solid solution is to be low (say about 10%) the ratio of organic non-solvent plus water to the cellulose at the beginning of the process should be about 0.5 parts or more by weight non-solvent plus water per part of cellulose. When the product (cellulose containing tertiary amine oxide) is to contain a high percentage of cellulose, say about 35% by weight, the ratio at the beginning of the process should be more than about 0.15 parts by weight non-solvent-water mixture per part of cellulose and less than about 2.0 parts by weight non-solvent-water mixture per parts of cellulose. With the preferred solvents, particularly N-methylmorpholine oxide and dimethylethanol amine oxide, a higher percentage of water is desirable, say 18–30%, in order to achieve a uniform solution in a considerably shorter time.

The dissolution of the cellulose appears to be independent of the ratio of non-solvent to water. However, as mentioned previously, the ratio must be such that the desired tertiary amine oxide-water ratio will remain in the cellulose after the non-solvent is removed. For best results, the amine oxide should contain from about 10% to about 25% by weight water and the amount of non-solvent in the slurry should be from about 20% by weight to about 50% based on the weight of amine oxide-water mixture.

Best results are obtained for the dried product after excess water and/or organic non-solvent have been removed contains from about 10% to about 35% by weight cellulose, 2 to 15% by weight water and the remainder i.e. about 50–88%, preferably 63–75% by weight, tertiary amine oxide.

The solid product, after the organic non-solvent has been removed and the water content has been reduced to from 2 to about 15% by weight water based on the weight of the product, may by heated to a temperature of, say, 120° C. or higher where the cellulose is dissolved by the amine oxide-water mixture remaining in the solid product without further addition of amine oxide, water or other material and the resulting solution may be spun or otherwise shaped into a useful cellulosic product.

Any suitable cellulose may be used in the process such as, for example, cotton linters or various kinds of wood cellulose, but it is preferred to use a rayon grade wood pulp.

Any suitable tertiary amine oxide which is a solvent for cellulose and is compatible with water and the organic liquid non-solvent, if an organic liquid non-solvent is used, may be used such as, for example, those disclosed in the aforesaid patents. However, the preferred tertiary amine oxides are dimethylethanol amine oxide, triethylamine oxide, certain cyclic mono-(n-methylamine-N-oxide) compounds such as, for example, N-methylmorpholine-N-oxide, N-methylpiperidine-N-oxide, N-methylhomopiperidine-N-oxide, n-methylpyrollidine-N-oxide, other cyclic amine oxides where the amine oxide functionality is exo to the cyclic functionality such as di-N-methylcyclohexylamine-N-oxide and dimethylbenzylamine-N-oxide, and the like.

Any suitable liquid non-solvent for cellulose may be used such as, for example, an alcohol, n-propyl alcohol, isopropyl alcohol, butanol and the like or an aprotic solvent such as toluene, xylene, dimethylformamide, dimethyl acetamide or the like.

In the following examples all parts and percentages are by weight unless otherwise stated.

EXAMPLE I

About 209 grams of dry rayon grade wood pulp containing about 6% water is soaked for about 5 minutes at 90° C. in about 829 grams dimethylcyclohexyl-amine oxide containing about 14.6% water, about 4 milliliters dimethyl-coco-amine oxide surfactant aids spinning and 80 ml of methanol. The wood pulp absorbs amine oxide, water and methanol with swelling of the fibers. The resulting mixture is stirred at 210 RPM for 10 minutes at 75° C. and then at 250 RPM for 15 minutes at 75° C. under a vacuum of 25 inches of mercury, removing the methanol and a portion of the water. The wood pulp dissolved, the solution containing about 8.9% by weight water and had a viscosity of [n] = 3.02. Upon cooling, a solid solution of cellulose in amine oxide was obtained. The product contained about 20.3% of cellulose.

EXAMPLE II

About 150 grams dry wood pulp is soaked about 10 minutes at 70° C. in a mixture prepared by mixing about 899 grams N-methylmorpholine oxide containing about 18.7% water, 13 milliliters water and 100 ml toluene. The resulting suspension is stirred about 10 minutes at 97° C. at 210 RPM. It is then stirred about 250 RPM at 97° C. under a vacuum of 25 inches of mercury resulting in the removal of toluene and a portion of the water. The solution crystallized slightly as it cooled to room temperature. The solid product thus obtained was cut into pieces and spun to form a yarn. The spinning solution contained about 12.6% water and had a viscosity of [n] = 4.14.

EXAMPLE III

About 10 grams rayon grade wood cellulose is soaked in a mixture prepared from about 90 grams dimethyl ethanol-amine oxide containing about 14.7% water, and 5 ml toluene at about 95°–97° C. for 10 minutes. The mixture is then stirred at 210 RPM about 10 minutes at 95°–97° C. and at 250 RPM at 97° C. for 55–60 minutes under vacuum at about 26 inches of mercury, removing the toluene and a portion of the water. The resulting solution is cooled to room temperature to form a solid solution of cellulose. It is later stored. Following heating to above the melting point, the solution is extruded into a non-solvent bath to coagulate the cellulose.

EXAMPLE IV

About 100 grams bone dry wood pulp is soaked in a mixture containing about 900 grams dimethyl-ethanolamine oxide containing about 14.7% water and about 50 ml toluene 10 minutes at 90° C. About 150 grams of the mixture is transferred to a vessel equipped with a stirrer and 5 ml. toluene are added thereto. The mixture is stirred for 25 minutes at 97° C. under a vacuum of 26 to 27 inches mercury removing the toluene and a portion of the water. A clear, highly viscous solution is obtained. After cooling and standing overnight, the solution becomes a crystalline solid. The melting point of the solid solution is about 75°–80° C. The solution contained about 8.7% water and has a viscosity before spinning of [n] = 3.54 and yarn [n] = 2.2. Slight decomposition occurred during spinning at 105° C.

The amine oxide used in practicing the invention may be prepared by oxidizing the amine as described in U.S. Pat. No. 3,333,000, U.S. Pat. No. 3,447,939 or other suitable process. For convenience, the amine oxide has been referred to herein as simply "amine oxide" but it is to be understood that the amine oxide is always a tertiary amine oxide.

Although the invention is described in detail for the purpose of illustration, it is to be understood that such detail is solely for that purpose and that variations can be made therein by those skilled in the art without departing from the spirit and scope of the invention except as it may be limited by the claims.

In each of the examples hereinabove, intrinsic viscosity [n] is determined with 0.5% cellulose concentration in cupriethylenediamine.

What is claimed is:

1. A process for making a solid precursor of a solution of cellulose in a tertiary amine oxide which comprises dissolving cellulose in a tertiary amine oxide solvent for cellulose containing a non-solvent for the cellulose compatible with said amine oxide solvent at a temperature where a liquid solution is obtained and cooling the solution until it solidifies to form a solid cellulosic product containing absorbed amine oxide and non-solvent.

2. The process of claim 1 wherein the said solid solution is comminuted to form cellulose chips adapted to be fed to an extruder.

3. The process of claim 1 wherein the non-solvent is water.

4. The process of claim 1 wherein the non-solvent is a water-organic non-solvent mixture.

5. The process of claim 1 wherein the tertiary amine oxide is N-methylmorpholine oxide.

6. The process of claim 1 wherein the tertiary amine oxide is dimethylcyclohexylamine oxide.

7. The process of claim 1 wherein the tertiary amine oxide is dimethylethanolamine oxide.

8. The process of claim 1 wherein the product contains from about 90% to about 50% by weight tertiary amine oxide, from 2% to 15% percent by weight water and from about 10% to about 35% by weight cellulose.

9. A process for making a precursor of a solution of cellulose in a tertiary amine oxide which comprises suspending cellulose in a mixture containing an amine oxide, water, and an organic liquid, which is miscible with the amine oxide and water and is non-solvent for cellulose at a temperature at which the cellulose dissolves, until a solution of cellulose is obtained, removing the organic liquid therefrom, and thereafter cooling the solution to provide a solid solution containing cellulose and absorbed amine oxide and water which is capable of becoming a solution of cellulose when heated without further addition of solvent for the cellulose.

10. A method for making a solid chip containing cellulose adapted to be melted and shaped comprising preparing a slurry containing cellulose and a mixture of a tertiary amine oxide solvent for the cellulose and a non-solvent for the cellulose containing water in an amount which improves the intimate association of the tertiary amine oxide and cellulose fibers, heating the slurry to dissolve the cellulose in the tertiary amine oxide and applying vacuum to remove any non-aqueous non-solvent, thereafter cooling the solution to form a solid solution of cellulose in tertiary amine oxide and water, and comminuting the product to form chips adapted for feeding to an extruder or similar processing equipment.

11. The method of claim 10 wherein the non-solvent is a mixture of an organic non-solvent and water and the organic non-solvent is removed as the cellulose dissolves in the tertiary amine oxide.

12. A process for making a solid cellulose product which is adapted to form a solution of cellulose by heating the said product alone, said process comprising dispersing cellulose in a liquid containing a tertiary amine oxide solvent for cellulose and a non-solvent for cellulose, dissolving the cellulose in said liquid mixture, and cooling the resulting solution until solidification to form a solid cellulosic product containing absorbed tertiary amine oxide solvent and water in an amount which will not dissolve the cellulose at ambient temperatures but is adapted to dissolve the cellulose when heated to form a shapeable solution.

13. The product of the process of claim 10.
14. The product of the process of claim 12.

* * * * *